US012183338B2

(12) United States Patent
Kim et al.

(10) Patent No.: US 12,183,338 B2
(45) Date of Patent: Dec. 31, 2024

(54) ELECTRONIC APPARATUS AND METHOD FOR CONTROLLING SPEECH RECOGNITION REQUEST

(71) Applicant: SAMSUNG ELECTRONICS CO., LTD., Suwon-si (KR)

(72) Inventors: Gaeul Kim, Suwon-si (KR); Chanhee Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 425 days.

(21) Appl. No.: 17/509,783

(22) Filed: Oct. 25, 2021

(65) Prior Publication Data

US 2022/0101853 A1    Mar. 31, 2022

Related U.S. Application Data

(63) Continuation of application No. PCT/KR2021/011883, filed on Sep. 2, 2021.

(30) Foreign Application Priority Data

Sep. 25, 2020  (KR) .................. 10-2020-0124570

(51) Int. Cl.
 *G10L 15/22*  (2006.01)
(52) U.S. Cl.
 CPC .................. *G10L 15/22* (2013.01)
(58) Field of Classification Search
 CPC ... G10L 15/22; G10L 2015/088; G10L 15/30; G10L 15/04; G10L 2015/223; G10L 2025/783; G06F 3/167
 See application file for complete search history.

(56) References Cited

U.S. PATENT DOCUMENTS 8,561,188 B1   10/2013 Wang et al.
9,064,013 B1 *  6/2015 Gay .................. H04L 9/40
   (Continued)

FOREIGN PATENT DOCUMENTS

EP   3 596 725 A1    1/2020
JP   2000-322087 A   11/2000
   (Continued)

OTHER PUBLICATIONS

Warden, P. (2018). Speech commands: A dataset for limited-vocabulary speech recognition. arXiv preprint arXiv:1804.03209. (Year : 2018).*

(Continued)

*Primary Examiner* — Douglas Godbold
*Assistant Examiner* — Philip H Lam
(74) *Attorney, Agent, or Firm* — Sughrue Mion, PLLC

(57) ABSTRACT

An electronic apparatus and a controlling method thereof are provided. The electronic apparatus includes a communication interface and a processor configured to: receive one or more speech recognition requests from at least one of a plurality of external apparatuses, each of the one or more speech recognition requests including a start command recognized by the at least one of the plurality of external apparatuses; identify whether a number of the one or more speech recognition requests within a time section exceeds a predetermined threshold; control speech recognition to be performed based on the number of the one or more speech recognition requests not exceeding the predetermined threshold; and transmit a result of the speech recognition to the at least one of the plurality of external apparatuses.

20 Claims, 11 Drawing Sheets

(56) References Cited

U.S. PATENT DOCUMENTS

| | | | |
|---|---|---|---|
| 10,553,219 B2 | 2/2020 | Jung | |
| 11,526,512 B1* | 12/2022 | Halabi | G06F 40/289 |
| 11,799,901 B2* | 10/2023 | Bansal | H04L 63/0227 |
| 2007/0186282 A1 | 8/2007 | Jenkins | |
| 2008/0228867 A1* | 9/2008 | Murphy | G06F 21/305 |
| | | | 709/203 |
| 2013/0166505 A1* | 6/2013 | Peretz | G06F 11/2041 |
| | | | 707/611 |
| 2014/0019488 A1* | 1/2014 | Wo | G06F 21/552 |
| | | | 707/784 |
| 2015/0287413 A1* | 10/2015 | Jung | G10L 15/32 |
| | | | 704/231 |
| 2016/0104483 A1* | 4/2016 | Foerster | G10L 25/78 |
| | | | 704/275 |
| 2016/0261611 A1* | 9/2016 | Heilig | H04L 63/1425 |
| 2016/0351196 A1* | 12/2016 | Fanty | G10L 15/183 |
| 2017/0084278 A1* | 3/2017 | Jung | G10L 17/02 |
| 2017/0230329 A1* | 8/2017 | Akef | H04L 61/5076 |
| 2018/0090127 A1* | 3/2018 | Hofer | G10L 15/07 |
| 2018/0173772 A1* | 6/2018 | Anantha | G06F 16/248 |
| 2018/0330728 A1* | 11/2018 | Gruenstein | G10L 17/00 |
| 2019/0287518 A1* | 9/2019 | Lee | G10L 15/30 |
| 2020/0168223 A1 | 5/2020 | Choi | |
| 2020/0286008 A1* | 9/2020 | Shen | G06Q 10/02 |
| 2021/0073240 A1* | 3/2021 | Almaraz | G06F 16/273 |

FOREIGN PATENT DOCUMENTS

| | | |
|---|---|---|
| JP | 2018-36397 A | 3/2018 |
| KR | 10-2006-0007148 A | 1/2006 |
| KR | 10-2016-0105847 A | 9/2016 |
| KR | 10-2020-0050152 A | 5/2020 |

OTHER PUBLICATIONS

International Search Report (PCT/ISA/210) issued Dec. 28, 2021 by the International Searching Authority in International Application No. PCT/KR2021/011883.

Written Opinion (PCT/ISA/237) issued Dec. 28, 2021 by the International Searching Authority in International Application No. PCT/KR2021/011883.

Communication dated Dec. 19, 2023, issued by the European Patent Office in European Application No. 21872763.4.

Carlini et al., "Hidden Voice Commands," Proceedings of the 25th USENIX Security Symposium, pp. 513-530, Aug. 2016, Total 19 pages.

* cited by examiner

ELECTRONIC APPARATUS AND METHOD FOR CONTROLLING SPEECH RECOGNITION REQUEST

CROSS-REFERENCE TO RELATED APPLICATION(S)

This application is a by-pass continuation application of International PCT Application No. PCT/KR2021/011883 filed Sep. 2, 2021, which is based on and claims priority to Korean Patent Application No. 10-2020-0124570 filed Sep. 25, 2020, in the Korean Intellectual Property Office, the disclosures of which are incorporated by reference herein in their entirety.

BACKGROUND

1. Field

The disclosure relates to an electronic apparatus, which applies a speech recognition process to an audio signal of user utterance received from an external apparatus and provides a speech recognition result of the audio signal to the external apparatus, and a control method thereof, and more particularly to an electronic apparatus, which accurately detects and processes a request for the speech recognition when the request received from an external apparatus is misrecognized, and a method of controlling the same.

2. Description of Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information, an image processing apparatus for processing image data, an audio apparatus for audio process, home appliances for miscellaneous household chores, etc. The image processing apparatus may include a display apparatus that displays an image based on processed image data on its own display panel.

Various kinds of such electronic apparatuses may be provided to collaborate with each other by making use of their own characteristics and functions, such as establishing a network, requesting a specific job to each other, returning a result corresponding to the request, etc. For example, in terms of a speech recognition function, there may be a system including a server that receives audio signals detected by client devices, performs speech recognition with regard to the audio signals received from various client devices and transmits speech recognition results to the client devices. According to this system, the server having relatively high system resources takes full charge of the speech recognition process so that a user of each client device can get a speech recognition service even when the client device itself does not support the function of the speech recognition process.

When a user's utterance is input through a microphone, the client device calls the server and requests the speech recognition process for an audio signal of the user's utterance. Here, there are many methods by which the client device detects whether a user utters a word. One of the methods may be a method of using a start command or a trigger word. For example, when a trigger word is detected in an audio signal, the client device may process subsequent audio signals, which is input after the input of the trigger word, as a target for the speech recognition process.

However, a sound input through the microphone includes not only a user's utterance but also various sounds generated in the surroundings of the microphone, and therefore the above method may allow the client device to misrecognize the trigger word. In particular, it will be assumed that a plurality of client devices reproduce a common live broadcast program at the same time and the broadcast program involves an audio component to be misrecognized as the trigger word. In this case, the plurality of client devices detect the trigger word at the same time and call the server at the same time, and therefore the server may be flooded with requests from the plurality of client devices.

SUMMARY

In accordance with an aspect of the disclosure, there is provided an electronic apparatus including: a communication interface; and a processor configured to: receive one or more speech recognition requests from at least one of a plurality of external apparatuses, each of the one or more speech recognition requests including a start command recognized by the at least one of the plurality of external apparatuses; identify whether a number of the one or more speech recognition requests within a time section exceeds a threshold; control speech recognition to be performed based on the number of the one or more speech recognition requests not exceeding the threshold; and transmit a result of the speech recognition to the at least one of the plurality of external apparatuses.

The processor is further configured to perform the speech recognition on the one or more speech recognition requests, each of the one or more speech recognition requests comprising user utterance within the time section.

The processor is further configured to adjust the threshold based on historical data on the one or more speech recognition requests that have been received from the plurality of external apparatuses.

The processor is further configured to adjust the threshold based on an average of the number of the one or more speech recognition requests in a plurality of time sections.

The processor is further configured to adjust a time width of the time section based on a point in time at which the at least one of the plurality of external apparatuses receives and reproduces content.

The processor is further configured to adjust a time width of the time section based on a network condition with the at least one of the plurality of external apparatuses through the communication interface.

The processor is further configured to adjust a time width of the time section, based on an average of time widths of a plurality of time sections where the number of the one or more speech recognition requests is greater than or equal to a value.

The processor is further configured to control the speech recognition not to be performed for the one or more speech recognition requests in a second time section, based on a difference in the number of the one or more speech recognition requests between a first time section and the second time section adjacent to each other exceeding a difference threshold.

The processor is further configured to: store information about content corresponding to misrecognition of the plurality of external apparatuses, and not to perform the speech recognition for the one or more speech recognition requests based on the one or more speech recognition requests received from the at least one of the plurality of external apparatuses being identified as corresponding to the content.

The electronic apparatus of claim 1, wherein the processor is further configured to transmit a message including a status that the speech recognition is not performed for the one or more speech recognition requests exceeding the threshold, to the plurality of external apparatuses so that the message can be displayed on the at least one of the plurality of external apparatuses.

In accordance with an aspect of the disclosure, there is provided a method of controlling an electronic apparatus. The method includes: receiving one or more speech recognition requests from at least one of a plurality of external apparatuses, each of the one or more speech recognition requests including a start command recognized by the at least one of the plurality of external apparatuses; identifying whether a number of the one or more speech recognition requests within a time section exceeds a threshold; controlling speech recognition to be performed based on the number of the one or more speech recognition requests not exceeding the threshold; and transmit a result of the speech recognition to the at least one of the plurality of external apparatuses.

The speech recognition is performed on the one or more speech recognition requests, each of the one or more speech recognition requests comprising user utterance within the time section.

The threshold is adjusted based on historical data on the one or more speech recognition requests that have been received from the plurality of external apparatuses.

The threshold is adjusted based on an average of the number of the one or more speech recognition requests in a plurality of time sections.

A time width of the time section is adjusted based on a point in time at which the at least one of the plurality of external apparatuses receives and reproduces content.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Below, embodiments will be described in detail with reference to the accompanying drawings. Further, the embodiments described with reference to the accompanying drawings are not exclusive to each other unless otherwise mentioned, and a plurality of embodiments may be selectively combined. The combination of embodiments may be discretionally selected and applied to realize the inventive concept by a person having an ordinary skill in the art.

In the description of the embodiments, an ordinal number such as first, second, etc. is used to describe variety of elements, and for distinguishing one element from another. Therefore, the meanings of the elements are not limited by these terms, and the terms are also used for explaining the corresponding embodiment without limiting the scope of the disclosure.

The term "at least one of a, b or c" indicates only a, only b, only c, both a and b, both a and c, both b and c, or all of a, b, and c.

Figure 1:
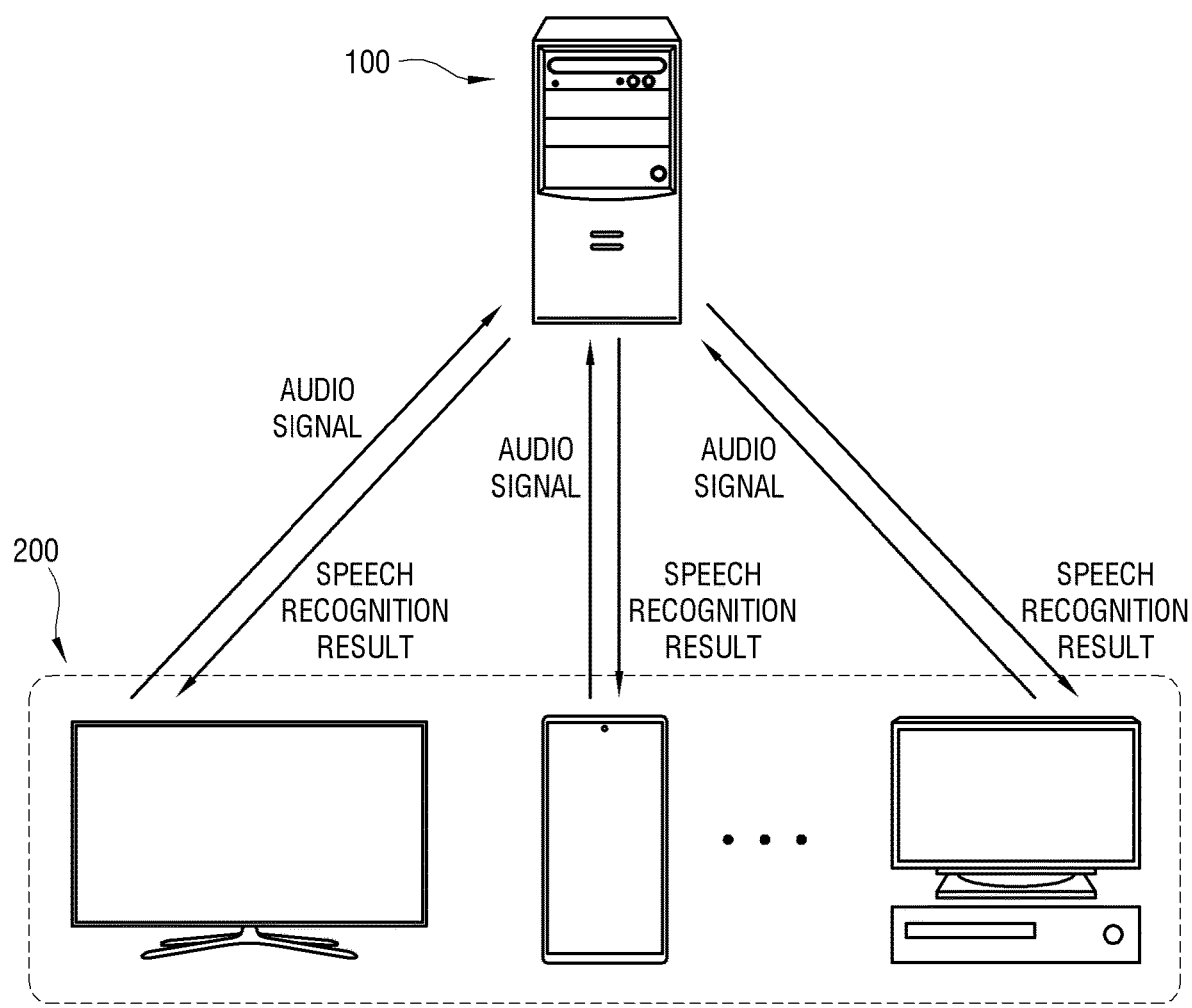
FIG. 1 is a diagram illustrating an electronic apparatus connected to a plurality of external apparatuses according to an embodiment.

FIG. 1 is a diagram illustrating an electronic apparatus connected to a plurality of external apparatuses according to an embodiment.

Referring to FIG. 1, an electronic apparatus 100 is provided to communicate with a plurality of external apparatuses 200. In an embodiment, the electronic apparatus 100 may be a server, and the plurality of external apparatuses 200 may be as client devices. However, the electronic apparatus 100 may include various apparatuses (for example, a host apparatus, a master apparatus, etc.) as well as the server, and the external apparatus 200 may be provided as an apparatus corresponding to the role of such an electronic apparatus 100 (for example, a slave apparatus).

The electronic apparatus 100 and the external apparatus 200 may be embodied by various kinds of apparatuses, for example, a personal computer (PC), a server or the like information processing apparatus, a television (TV), a monitor, a digital signage, an electronic blackboard, an electronic frame or the like stationary display apparatus, a smartphone, a tablet device, a portable multimedia player or the like mobile device, a set-top box, an optical media player or the like image processing apparatus, a refrigerator, a washing machine, a clothing manager, an air conditioner or the like home appliances, a gateway for establishing the Internet of things (IOT) environment, a hub, a host apparatus, a slave apparatus, or a wearable device.

The electronic apparatus 100 and the external apparatus 200 are connected to a wide area network (WAN) or a local area network (LAN), and are capable of communicating with each other through various communication standards or means. In an embodiment, the electronic apparatus 100 including the server is connected to various kinds of external apparatuses 200 through the WAN, but this is merely an example. There are no limits to the number and kinds of external apparatuses 200 connectable to the electronic apparatus 100, and the number and kinds of external apparatuses 200 may be variously designated within system resources provided by the electronic apparatus 100.

According to an embodiment, the electronic apparatus 100 and the plurality of external apparatuses 200 form a system for a speech recognition service. Each of the plurality of external apparatuses 200 may detect a user's utterance and transmit an audio signal of utterance to the electronic apparatus 100. The electronic apparatus 100 may perform a speech recognition process to the audio signal received from each of the plurality of external apparatuses 200, and transmit a speech recognition result of the audio signal to each of the plurality of external apparatuses 200. For example, the electronic apparatus 100 converts an audio signal into a text, determines a command intended by the text through a semantic analysis of the text, and transmits the command to the external apparatus 200. The external apparatus 200 performs operation based on instructions of the command received from the electronic apparatus 100.

Below, the configurations of the electronic apparatus 100 and the external apparatus 200 will be described.

Figure 2:
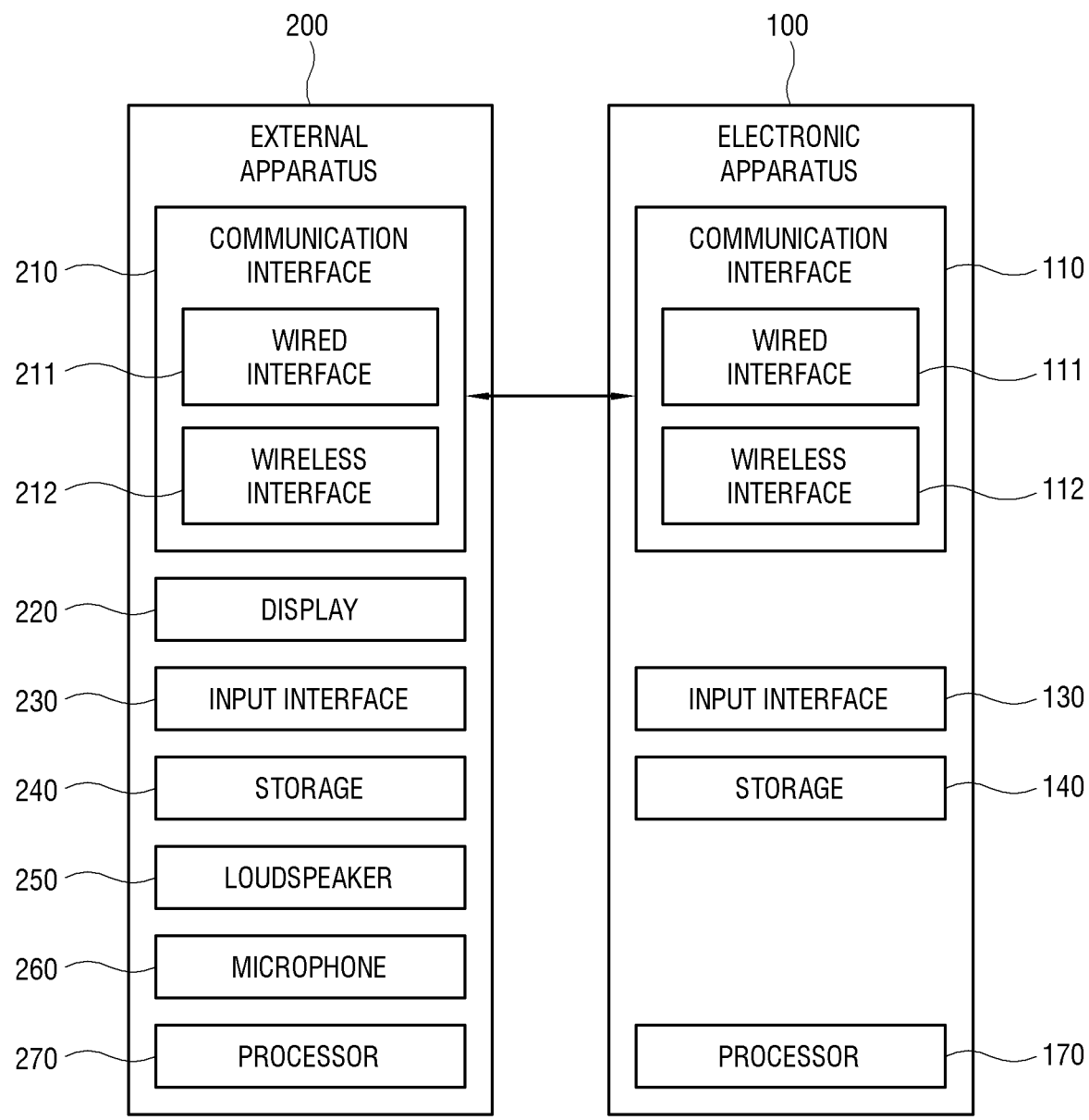
FIG. 2 is a block diagram of an electronic apparatus and an external apparatus according to an embodiment.

FIG. 2 is a block diagram of an electronic apparatus and an external apparatus according to an embodiment.

As shown in FIG. 2, the electronic apparatus 100 and the external apparatus 200 include various hardware elements. As described above, the electronic apparatus 100 and the external apparatus 200 may be embodied by various kinds of apparatuses, and the following configurations are merely one of various examples.

The electronic apparatus 100 may include a communication interface 110. The communication interface 110 includes an interface circuit through which the electronic apparatus 200 performs communication with various kinds of external apparatuses 200 and transmits and receives data. The communication interface 110 may include a wired interface 111 for wired communication and a wireless interface 112 for wireless communication according to connection types.

The wired interface 111 includes a connector or port to which a cable of previously defined transmission standards is connected. For example, the wired interface 111 includes a port connecting with a terrestrial or satellite antenna to receive a broadcast signal or connecting with a cable for cable broadcasting. Further, the wired interface 111 include ports to which cables of various wired transmission standards such as high definition multimedia interface (HDMI), DisplayPort (DP), digital video interactive (DVI), component, composite, S-video, thunderbolt, and the like to connect with various image processing apparatuses. Further, the wired interface 111 includes a port of universal serial bus (USB) standards to connect with a USB device. Further, the wired interface 111 includes an optical port to which an optical cable is connected. Further, the wired interface 111 includes an audio input port to which an external microphone is connected, and an audio output port to which a headset, an earphone, a loudspeaker etc. is connected. Further, the wired interface 111 includes an Ethernet port connected to a gateway, a router, a hub, etc. for connection with the WAN.

The wireless interface 112 includes an interactive communication circuit including at least one of elements such as a communication module, a communication chip, etc. corresponding to various kinds of wireless communication protocols. For example, the wireless interface 112 includes a Wi-Fi communication chip for wireless communication with the AP based on Wi-Fi; a communication chip for wireless communication based on Bluetooth, Zigbee, Z-Wave, Wireless HD, wireless gigabits (WiGig), near field communication (NFC), etc., an infrared (IR) module for IR communication, a mobile communication chip for mobile communication with a mobile device; etc.

The electronic apparatus 100 may include an input interface 130. The input interface 130 includes one or more circuits related to various kinds of input interfaces to be controlled by a user to receive a user input. The input interface 130 may be variously configured according to the kinds of electronic apparatus 100, and may include, for example, a mechanical or electronic button, various kinds of sensors, a touch pad, a touch screen, etc. Alternatively, the input interface 130 may include an external input device such as a keyboard, a mouse, a remote controller, etc.

The electronic apparatus 100 may include a storage 140. The storage 140 is configured to store digitalized data. The storage 140 includes a nonvolatile storage in which data is retained regardless of whether power is supplied or not, and a volatile memory in which data loaded to be processed by a processor 170 is retained only when power is supplied. The storage includes a flash memory, a hard disc driver (HDD), a solid-state drive (SSD), a read only memory (ROM), etc., and the memory includes a buffer, a random-access memory (RAM), etc.

The electronic apparatus 100 may include the processor 170. The processor 170 includes one or more hardware processors achieved by a central processing unit (CPU), a chipset, a buffer, a circuit, etc. which are mounted on a printed circuit board (PCB). Alternatively, the processor 170 may be designed as a system on chip (SoC). In an embodiment, the processor 170 may be configured to receive a speech recognition request including an audio signal from the external apparatus 200 through the communication interface 110, perform the speech recognition process for the audio signal, and transmit a speech recognition result to the corresponding external apparatus 200 through the communication interface 110.

Here, the speech recognition process may include various subordinate stages, in which the processor 170 may process all such subordinate stages or may share the subordinate stages with other separate apparatuses. For example, the speech recognition process may be divided into a first stage and a second stage. The first stage may include a speech-to-text (STT) process for converting an audio signal into a text, and the second stage may include a semantic analysis process for deriving a command based on content of the text. For example, the first stage may be performed by another apparatus communicating with the electronic apparatus 100 and the second stage may be performed by the processor 170 of the electronic apparatus 100. The electronic apparatus 100 may autonomously perform both the STT process and the semantic analysis process, or may transmit an audio signal received from the external apparatus 200 to an STT server, receive a text from the STT server, and perform the semantic analysis with regard to the text.

The external apparatus 200 includes various hardware elements. The external apparatus 200 may be a display apparatus. The external apparatus 200 may, for example, include a communication interface 210 including a wired interface 211 and a wireless interface 212, a display 220, an input interface 230, a storage 240, a loudspeaker 250, a microphone 260, and a processor 270. The communication interface 210, the wired interface 211, the wireless interface 212, the input interface 230, the storage 240, etc. may perform the same or similar functions as described above with reference to the electronic apparatus 100, and therefore repetitive descriptions thereof will be omitted.

The external apparatus 200 may include the display 220. The display 220 forms a screen for displaying an image based on an image signal processed by the processor 270. The display 220 includes a display panel, and the display panel may be designed to have various structures. For example, the display 220 may include a display panel having a light-receiving structure like liquid crystal, and a backlight unit illuminating the display panel. Alternatively, the display 220 may include a display panel having a self-emissive structure like an organic light emitting diode (OLED). Alternatively, the display 220 may have a structure forming a large screen with tiling combination of a plurality of micro light emitting diode (LED) modules.

The external apparatus 200 may include the loudspeaker 250. When the processor 270 reproduces predetermined content, the loudspeaker 250 outputs a sound based on an audio signal of the content. The loudspeaker 250 may be provided in the external apparatus 200, or may be provided as a separate apparatus. When the loudspeaker 250 is provided as the separate apparatus, the loudspeaker 250 is connected to the communication interface 210, and the audio signal is transmitted to the loudspeaker 250 through the communication interface 210.

The external apparatus 200 may include the microphone 260. The microphone 260 generates an audio signal by collecting sounds generated in ambient environments of the external apparatus 200, and transmits the audio signal to the processor 270. In an embodiment, the microphone 260 is an element separated from the input interface 230, but may be designed to be included in the input interface 230.

However, the microphone 260 may be separately provided from the external apparatus 200. In other words, the external apparatus 200 may obtain an audio signal of surrounding sounds from a connectable separate apparatus (for example, a mobile device, a remote controller or the like with the microphone). In this case, the external apparatus 200 receives an audio signal from the separate apparatus including the microphone 260 through the communication interface 210.

The external apparatus 200 may include the processor 270. The processor 270 includes one or more hardware processors achieved by a CPU, a chipset, a buffer, a circuit, etc. which are mounted on a PCB. Alternatively, the processor 270 may be designed as a SoC. When the external apparatus 200 is a display apparatus, the processor 270 includes modules corresponding to various processes of a demultiplexer, a decoder, a scaler, an audio digital signal processor (DSP), an amplifier, etc. to display an image based on image content. Here, some or all of such modules may be achieved by the SoC. For example, the demultiplexer, the decoder, the scaler, and the like module related to an image process may be achieved as an image processing SoC, and the audio DSP may be achieved as a chipset separated from the SoC. For example, the processor 270 may reproduced predetermined content by outputting sound of the content through the loudspeaker 250 while an image of the content is displayed on the display 220.

In this embodiment, the processor 270 detects a user's utterance collected through the microphone 260 or the like, and requests the speech recognition for an audio signal of the corresponding utterance to the electronic apparatus 100. When a speech recognition result of the audio signal is received from the electronic apparatus 100, the processor 270 performs an operation instructed by the received speech recognition result.

In addition, there are many methods by which the external apparatus 200 receives the audio signal of the user utterance. Below, various examples of receiving the audio signal will be described.

Figure 3:
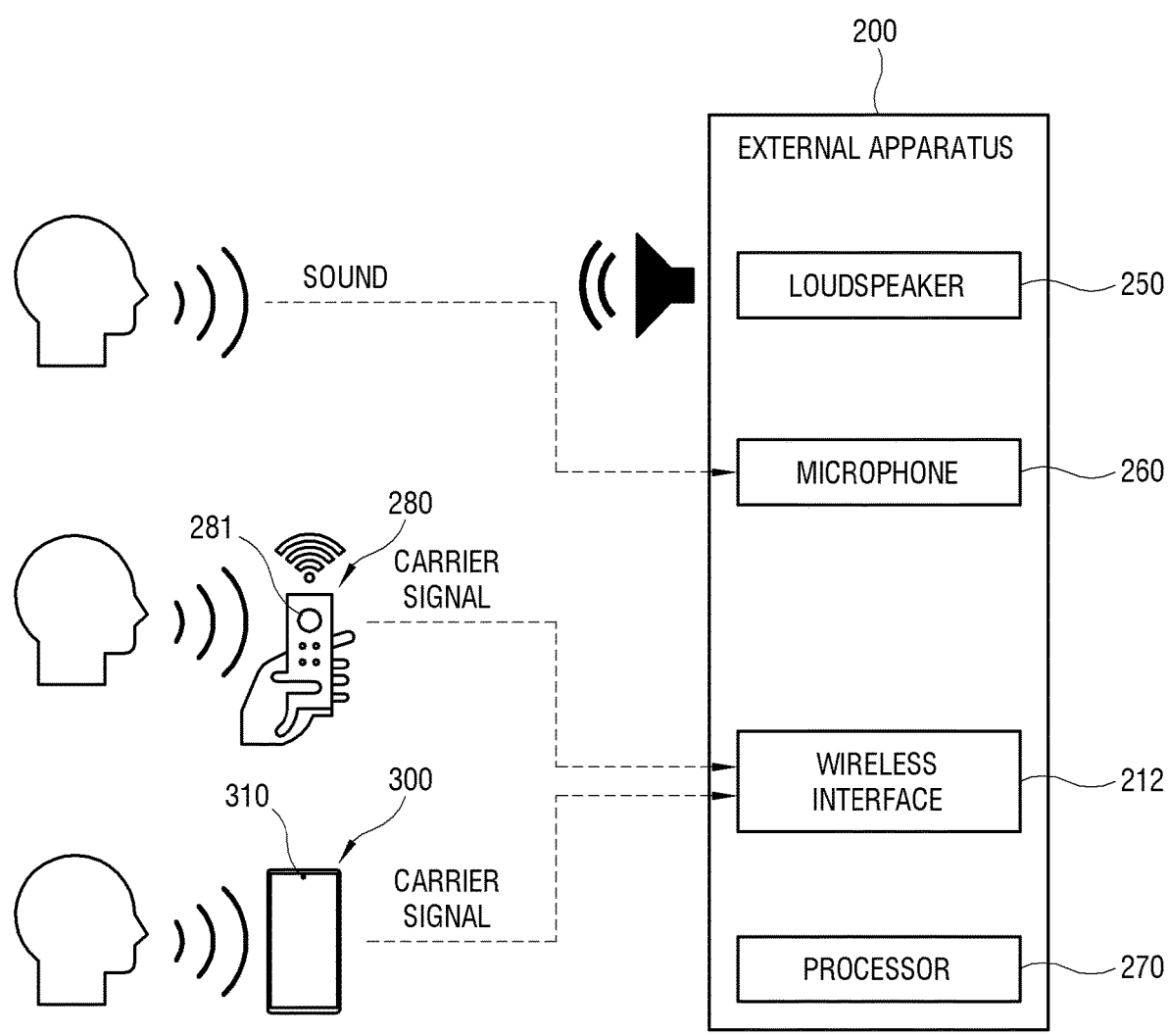
FIG. 3 is a diagram illustrating various methods by which an external apparatus receives an audio signal of user utterance according to an embodiment.

FIG. 3 is a diagram illustrating various methods by which an external apparatus receives an audio signal of user utterance according to an embodiment.

Referring to FIGS. 2 and 3, as an example of collecting the user utterance, the external apparatus 200 may include the microphone 260, that collects sounds of ambient environments. The microphone 260 transmits an audio signal based on the collected sounds of the ambient environments to the processor 270. The microphone 260 may be activated to collect the sounds of the ambient environments. Alternatively, the microphone 260 may be inactivated or be in a standby mode not to collect a sound, and then activated to collect a sound when a specific condition is satisfied. Such a condition may be variously designed. For example, the condition may be satisfied when a level of noise generated in the ambient environments exceeds a predetermined threshold. Of course, the microphone 260 may be switched over between the activation and the inactivation in response to a user input.

As another example of collecting the user utterance, a remote controller 280 provided separately from the external apparatus 200 may include a microphone 281, and collect sounds of ambient environments through the microphone 281. Generally, the remote controller 280 is more likely to be close in proximity to a user, and therefore the microphone 281 provided in the remote controller 280 is capable of collecting more clear audio signal of a user's utterance than the microphone 260 provided in the external apparatus 200. The remote controller 280 converts an audio signal of a sound collected through the microphone 281 into a carrier signal based on predetermined transmission standards, and transmits the carrier signal to the wireless interface 212. The carrier signal received in the wireless interface 212 is converted into an audio signal, and the audio signal is transmitted to the processor 270.

The method of switching the microphone 281 of the remote controller 280 over between the activation and the inactivation may be variously designed. Because the remote controller 280 operates using a built-in battery without being connected to an external power source, there may be an issue with a power efficiency that the microphone 281 is always activated.

For example, the remote controller 280 may include a toggle button for switching the microphone 281 over between the activation and the inactivation. A user controls the toggle button so that the remote controller 280 can activate or inactivate the microphone 281.

Alternatively, like the foregoing microphone 260 provided in the external apparatus 200, the remote controller 280 may control whether to activate the microphone 281. For example, the microphone 281 may be inactivated or be in a standby mode not to collect a sound, and then activated to collect a sound when a specific condition that a level of noise generated in ambient environments exceeds a predetermined threshold is satisfied.

Alternatively, as another example of collecting the user utterance, when a mobile device 300 such as a smartphone or a tablet device includes a microphone 310, a sound of ambient environments may be collected through the microphone 310. The mobile device 300 may perform an operation related to the external apparatus 200 by software related to the external apparatus 200. For example, when the external apparatus 200 is a TV, the mobile device 300 may install a dedicated application for controlling the TV, and transmit an audio signal of a sound collected through the microphone 310 to the external apparatus 200 under the condition that the corresponding application operates. The mobile device 300 converts the audio signal into a carrier signal, and wirelessly transmits the carrier signal to the wireless interface 212. The carrier signal received in the wireless interface 212 is converted into the audio signal, and then transmitted to the processor 270.

Thus, the external apparatus 200 obtains an audio signal corresponding to a sound of ambient environments by various methods. When a preset trigger word (or a previous command) is detected in the obtained audio signal, the processor 270 identifies that an audio signal obtained subsequently to the corresponding trigger word is the user utterance (in other words, a target for the speech recognition). The trigger word refers to a word or a sentence previously set to inform the external apparatus 200 of that a user will utter a command, and may include any content as long as it can be uttered by a user with his/her voice.

However, the audio signal obtained by the external apparatus 200 may include a component of a sound that is not uttered by a user. For example, while the processor 270 is reproducing predetermined content, an audio of corresponding content is output as a sound through the loudspeaker 250. In particular, when content that a user is speaking is reproduced, a component of a sound collected through the microphone 260 or the like may be very similar to the trigger word in certain conditions. As such, the external apparatus 200 incorrectly detects the trigger word and analyzes a sound component of the obtained audio signal, and does not identify whether the corresponding sound component is caused by the user utterance or the sound output through the loudspeaker 250. In other words, even though a user does not utter a trigger word, the external apparatus 200 may recognize as if the trigger word is input.

The electronic apparatus 100 according to an embodiment of the disclosure detects speech recognition requests from a plurality of the external apparatus 200 caused due to the misrecognition of the trigger word. Below, a detection method of the electronic apparatus 100 will be described.

Figure 4:
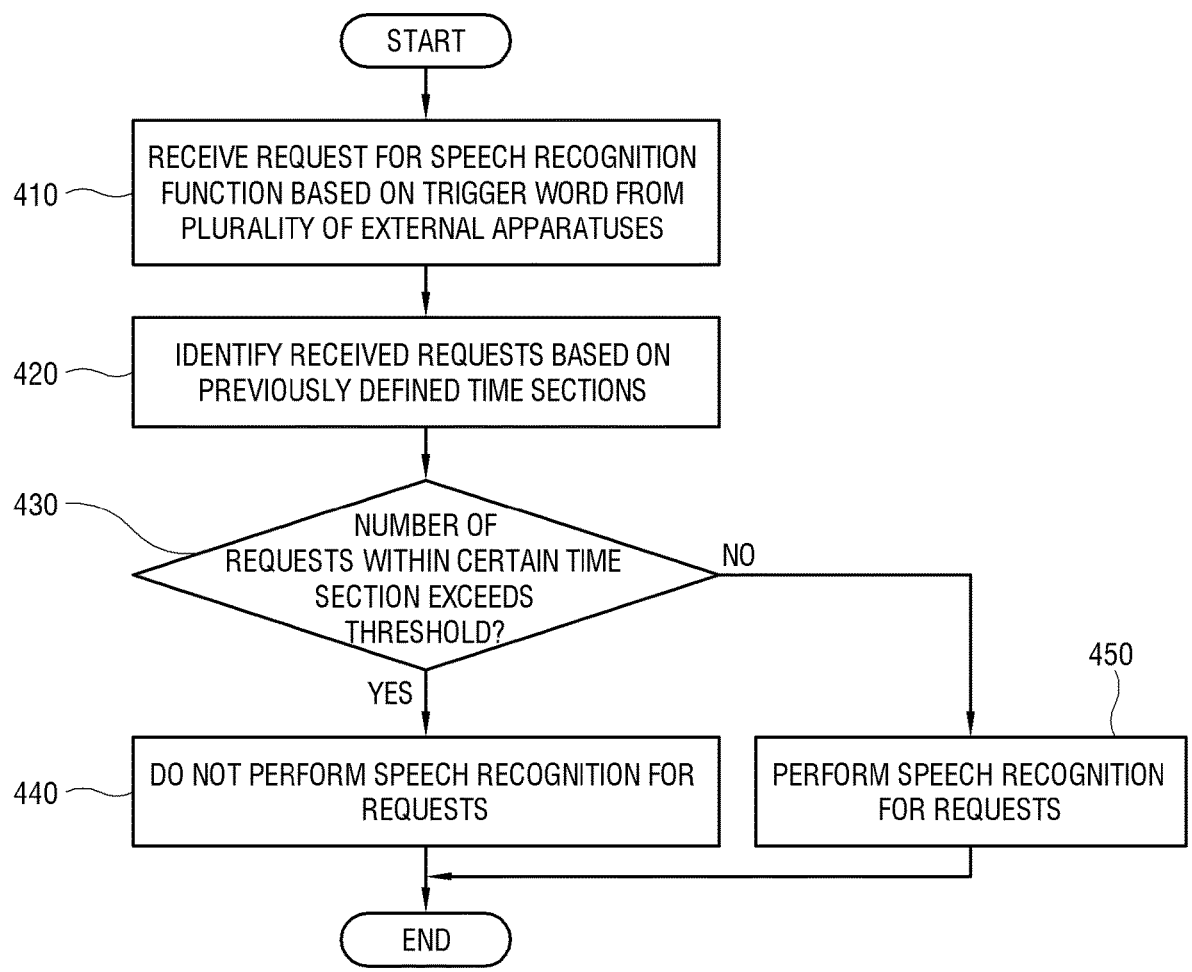
FIG. 4 is a flowchart showing a method of controlling an electronic apparatus according to an embodiment.

FIG. 4 is a flowchart showing a method of controlling an electronic apparatus according to an embodiment.

As shown in FIGS. 2 and 4, the following operations are performed by the processor 170 of the electronic apparatus 100.

At operation 410, the electronic apparatus 100 receives a request for a speech recognition function based on a trigger word from a plurality of external apparatuses 200.

At operation 420, the electronic apparatus 100 identifies the received requests based on a previously defined time section. For example, the electronic apparatus 100 sets a plurality of time sections having previously defined time widths, and identifies the requests corresponding to the time sections based on points of time when the requests are received.

At operation 430, the electronic apparatus 100 identifies whether the number of requests in a certain time section exceeds a threshold. Here, the threshold is previously defined based on the misrecognition of the plurality of external apparatuses 200 with regard to the start command.

When it is identified that the number of requests within the certain time section exceeds the threshold ("YES" in the operation 430), at operation 440, the electronic apparatus 100 does not perform the speech recognition for the requests.

On the other hand, when it is identified that the number of requests within the corresponding time section does not exceed the threshold ("NO" in the operation 430), at operation 450, the electronic apparatus 100 performs the speech recognition for the requests within the corresponding time section.

When the number of requests for the speech recognition exceeds the threshold within a specific time section, the electronic apparatus 100 identifies that the requests within the corresponding time section are caused by the misrecognition of the trigger word, and thus, does not process the corresponding requests. Thus, the electronic apparatus 100 may identify the request due to the misrecognition of the trigger word, which occurs in a specific condition.

Below, detailed reasons why the electronic apparatus 100 performs the operations 430 to 450 will be described.

Figure 5:
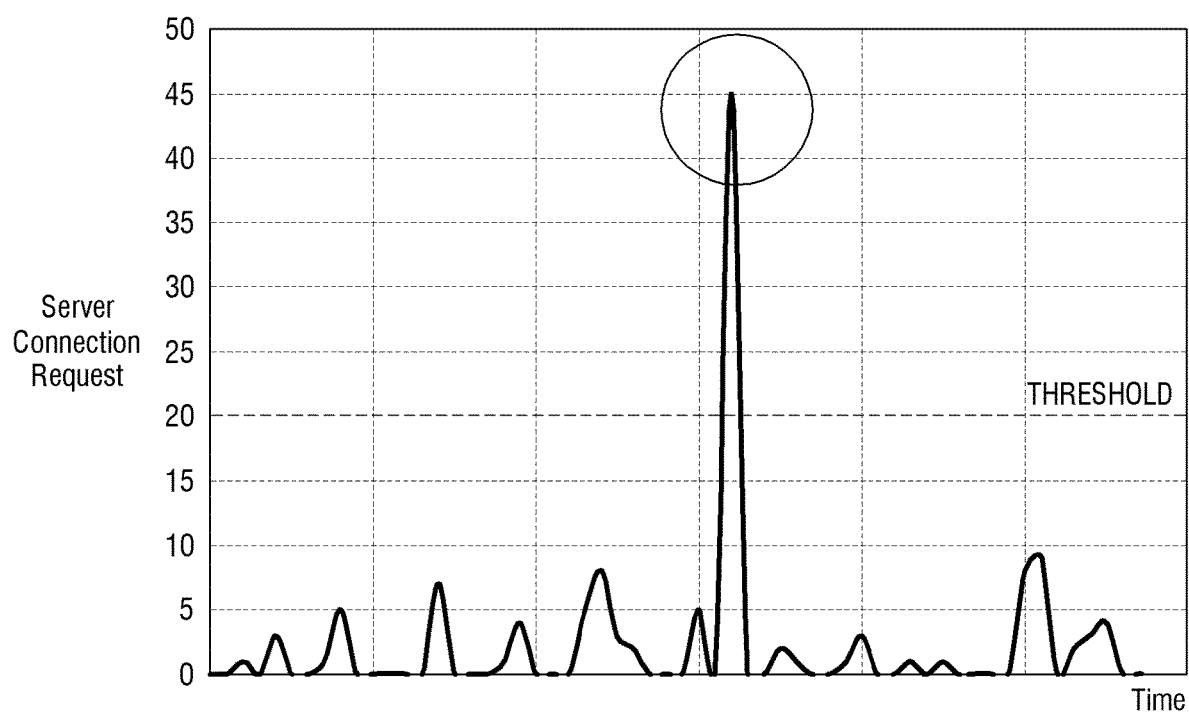
FIG. 5 is a graph showing changes in the number of requests that an electronic apparatus receives from a plurality of external apparatuses as time elapses.

FIG. 5 is a graph showing change in the number of requests that an electronic apparatus receives from a plurality of external apparatuses as time elapses.

Referring to FIGS. 2 and 5, the electronic apparatus 100 receives requests for the speech recognition function from the plurality of external apparatuses 200 based on the trigger word. The graph of FIG. 5 shows a change in the number of requests received in the electronic apparatus 100 from a plurality of external apparatuses 200 as time elapses.

Under the condition that the external apparatus 200 detects an input of the trigger word and requests the electronic apparatus 100 to perform the speech recognition function, there may be various causes of making the external apparatus 200 misrecognize the trigger word. One of such causes may be that an audio of content output through the loudspeaker 250 is misrecognized as the trigger word because the audio of the content is collected in the microphone 260 of the external apparatus 200.

It will be assumed that this content is a live program broadcasted in a specific time and reproduced in many external apparatuses 200. Although the external apparatuses 200 may be different according to their features, it is expected that the misrecognition of the trigger word occurs in most of the external apparatuses 200 which are reproducing the corresponding content. In this case, the plurality of external apparatuses 200 request the speech recognition process to the electronic apparatus 100 around the same time.

When usual tendency of speech recognition requests is taken into account, the number of speech recognition requests normally made by the external apparatuses 200 based on the trigger word does not show a high peak. Referring to the graph of FIG. 5, the number of normal speech recognition requests is not more than 10 at the same point in time.

On the other hand, the number of requests is sharply increases at a specific point in time. For example, the request is made as many as 45 times. This case refers to mass misrecognition of the trigger word due to an audio of content when the plurality of external apparatuses 200 reproduce the content of the same live program as described above.

Taking this condition into account, the electronic apparatus 100 sets the threshold about the number of requests received from the plurality of external apparatuses 200. The threshold may be quantified based on a simulation or experiment, and may be varied depending on specific conditions. For example, the threshold may be based on an average number of requests according to time sections for predetermined period of time, from a historical data on the number of requests that the electronic apparatus 100 has received.

The foregoing embodiments show that the electronic apparatus 100 is configured to set the plurality of time sections having the previously defined time widths (see the operation 420 of FIG. 4). Below, it will be described that the time section is set and applied.

Figure 6:
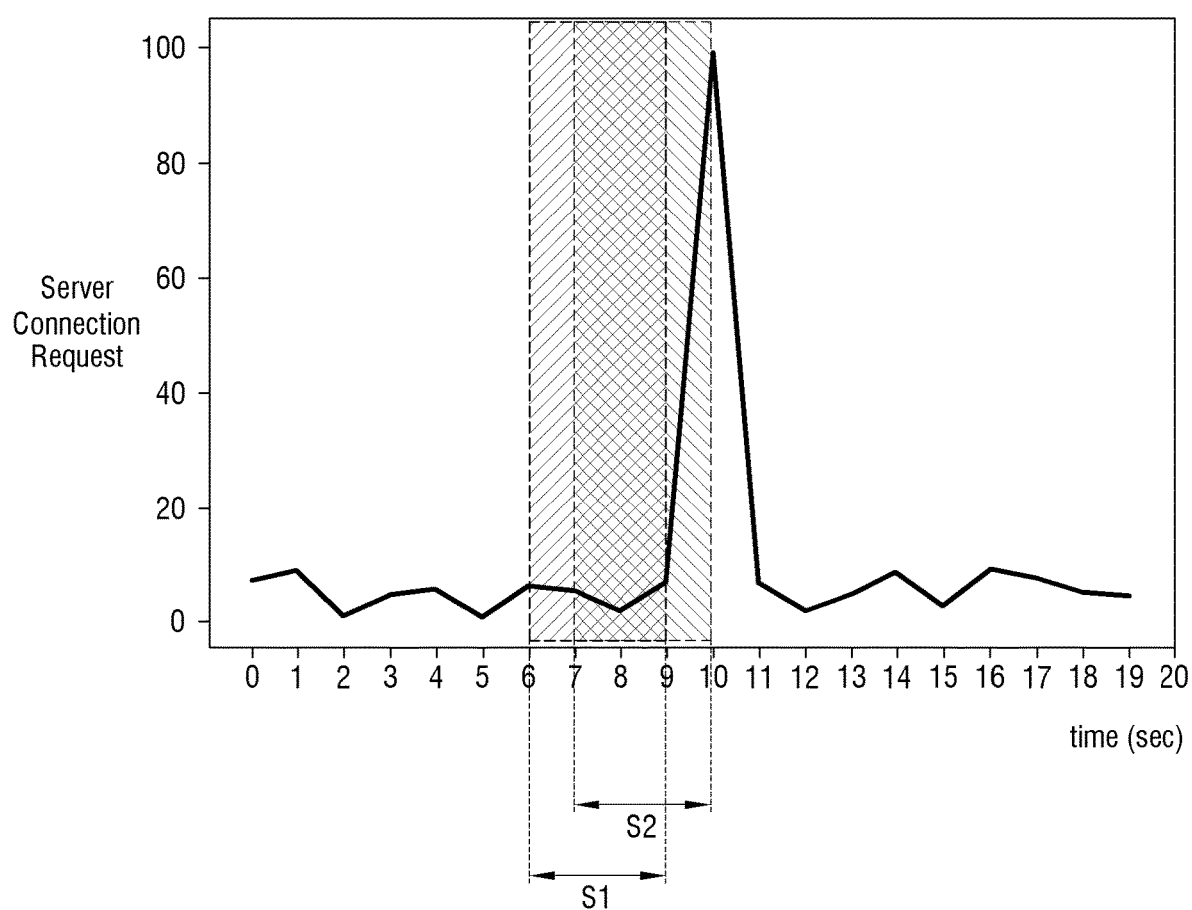
FIG. 6 illustrates a graph showing changes in the number of requests an electronic apparatus receives from a plurality of external apparatuses by time sections.

FIG. 6 illustrates a graph showing changes in the number of requests an electronic apparatus receives from a plurality of external apparatuses by time sections.

Referring to FIGS. 2 and 6, the electronic apparatus 100 receives the speech recognition requests from the plurality of external apparatuses 200 as time elapses. Although live broadcast content received in the external apparatuses 200 is transmitted from the transmitter of the same broadcasting station, the plurality of external apparatuses 200 may receive and reproduce the corresponding content at different points in time due to various causes.

For example, the further the distance between the external apparatus 200 and the transmitter of the broadcasting station, the longer the time it takes to receive the content. Alternatively, although each of the external apparatuses 200 are located at the same distance from the transmitter of the broadcasting station, there may be a situation in which the external apparatus 200 located close to, for example, a mountain, a building and the like structures that causes interference with transmission of a signal, thereby causing contents to be received at a later time. Alternatively, the external apparatus 200 may reproduce content at a later time according to its own system resources (e.g., performance of a communication chip for receiving the content, performance of a processor and software for processing the content, system load at the present point in time, etc.).

Alternatively, the external apparatus 200 may receive not the live broadcast content from the transmitter of the broadcasting station, but content from a server connected through a WAN. For example, the server may provide previously stored image content in response to a request of the external apparatus 200, but may steam image content to the plurality of external apparatuses 200 through a communication network at a scheduled time. Although the plurality of external apparatuses 200 receive image content from the server at the same point in time, the external apparatuses 200 may receive and reproduce the content at different points in time according to conditions of the network for transmitting the image content (for example, transmission speed, noise interference, communication traffic, etc.)

Further, there may be a difference in communication environment between each of the plurality of external apparatuses 200 and the electronic apparatus 100. According to the communication traffic between the electronic apparatus 100 and the external apparatuses 200, there may be a difference in response speed of the electronic apparatus 100 to the requests of the external apparatuses 200.

In this regard, the electronic apparatus 100 counts the number of speech recognition requests not at an arbitrary point in time, but within a time section having a preset time width. In other words, the electronic apparatus 100 repetitively and periodically analyzes the received audio signal and performs identification of the misrecognition, and counts the number of speech recognition requests within the time section with respect to an identification point in time. An identification cycle may be variously set.

For example, as shown in this graph, the electronic apparatus 100 may set the time section to have a width of 3 ms. The electronic apparatus 100 counts the number of requests received from the plurality of external apparatuses 200 within a time section S1 having a width from 6 ms to 9 ms. Next, the electronic apparatus 100 counts the number of requests received from the plurality of external apparatuses 200 within a time section S2 having a width from 7 ms to 10 ms. In this way, the electronic apparatus 100 sequentially counts the number of requests while moving the time section along the time axis, and compares the counted number with the threshold. When the number of requests in a certain time section is greater than the threshold, the electronic apparatus 100 does not process the requests exceeding the threshold in the corresponding time section.

The electronic apparatus 100 may use a predetermined width without changing the width of the time section, but may be designed to change the width of the time section according to specific conditions. Below, one among various methods of changing the width of the time section will be described by way of example.

The width of the time section may be based on a sum of a first value related to a point in time when the external apparatus 200 receives content and a second value related to time for which the external apparatus 200 communicates with the electronic apparatus 100.

Regarding the first value, a point in time when the external apparatus 200 receives content from a content provider is varied depending on the current location of the external apparatus 200 (in other words, the distance between the external apparatus 200 and the content provider). The first value is not varied when the external apparatus 200 is used in a stationary manner. However, when the external apparatus 200 is a mobile device, the first value may be varied depending on change in the current location of the external apparatus 200. The electronic apparatus 100 identifies the locations of many external apparatuses 200 by various methods such as a global positioning system (GPS) or the like, and adjusts the first value based on the change in the locations of the plurality of external apparatuses 200. For example, the electronic apparatus 100 increases the first value when the external apparatuses 200 not fewer than a predetermined number get relatively far away from the content provider, but decreases the first value as the external apparatuses 200 more than a predetermined number get relatively closer to the content provider.

Regarding the second value, time for which the external apparatus 200 calls the electronic apparatus 100 and transmits a request to the electronic apparatus 100, time for which the electronic apparatus 100 responds to the received request, etc. may be varied depending on network conditions between the external apparatus 200 and the electronic apparatus 100. Thus, the electronic apparatus 100 may adjust the second value based on the network conditions (e.g., data transmission speed, etc.) with regard to the external apparatus 200. For example, the second value may be decreased when the network condition between the electronic apparatus 100 and the external apparatus 200 is relatively good, but the second value may be increased when the network condition between the electronic apparatus 100 and the external apparatus 200 is relatively bad.

As an alternative example among various methods of changing the width of the time section, the electronic apparatus 100 may adjust the width of the time section based on historical data about the width of the time section where the number of speech recognition requests is greater than or equal to a predetermined value. For example, with regard to the number of requests greater than or equal to a specific value, a plurality of peaks discontinuously appears in a changing curve of the number of requests versus an elapse of time. The electronic apparatus 100 calculates an average of the widths of such peaks, and adjusts the width of the time section based on the calculated average. For example, the electronic apparatus 100 increases the width of the time section when the calculated average is relatively large, but decreases the width of the time section when the calculated average is relatively small.

The foregoing embodiment shows that the electronic apparatus 100 identifies requests received in a certain time section as misrecognition and does not process the requests when the number of requests received in the certain time section exceeds the threshold. However, the method of identifying the misrecognition is not limited to this embodiment, and the electronic apparatus 100 may use various methods to identify the misrecognition.

For example, when a difference in the number of requests between two adjacent time sections exceeds a preset threshold, the electronic apparatus 100 may identify that the request in the latter time section is caused by the misrecognition. In the case of adjacent time sections S1 and S2, the electronic apparatus 100 obtains the number of requests r1 received in the time section S1 and the number of requests r2 received in the time section S2, and identifies whether (r2−r1) exceeds the threshold. For example, let r1=20, r2=110 and the threshold be 50. In this case, (r2−r1) is greater than the threshold. This shows that the number of requests in the time section S2 is sharply increased as compared with the number of requests in the time section S1. Thus, the electronic apparatus 100 does not process the requests received in the time section S2.

The electronic apparatus 100 may use various methods to identify whether the speech recognition request is caused by the misrecognition.

The processor 170 of the electronic apparatus 100 may perform at least a part of data analysis, data process and result information generation based on at least one of machine learning, neural network, deep learning algorithms as a rule-based or artificial intelligence (AI) algorithm in order to perform various operations, for example, adjusting the width of the time section, adjusting the threshold related to the number of requests received in the time section, or identifying whether the received speech recognition request is misrecognized.

For example, the processor 170 of the electronic apparatus 100 may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage of the electronic apparatus 100 or from the outside. The learning data may be data used for learning the neural network, and the data subjected to the foregoing operations may be used as the learning data for learning of the neural network.

Before learning of the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network which is set to perform the operations.

The learned neural network may include a plurality of neural networks (or layers). The nodes of the plurality of neural networks have weighted values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Moreover, the recognizer may obtain target data to carry out the foregoing operations. The target data may be obtained from the storage of the electronic apparatus 100 or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

Below, detailed methods by which the electronic apparatus 100 processes the speech recognition request according to time sections will be described.

Figure 7:
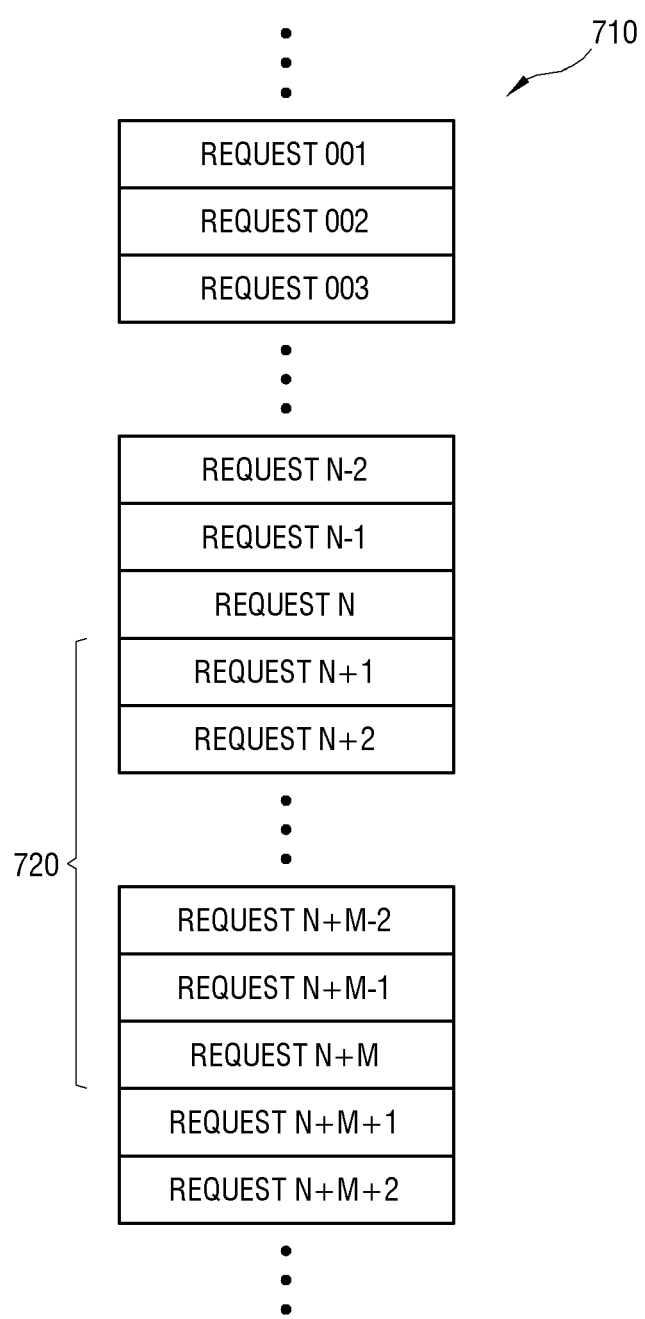
FIG. 7 illustrates a diagram showing an order of requests received by an electronic apparatus by time sections, according to an embodiment.

FIG. 7 is a diagram showing an order of requests received by an electronic apparatus by time sections according to an embodiment.

Referring to FIGS. 2 and 7, the electronic apparatus 100 receives a speech recognition request 710 from each external apparatus 200 as time elapses. The electronic apparatus 100 assigns index numbers for identification to the received request 710. The electronic apparatus 100 assigns the index numbers to the corresponding requests 710 in order, at a point in time when it is identified that the request 710 is received. For example, an index number of "Request 001" is assigned to an initially identified request 710, an index number of "Request 002" is assigned to a subsequently identified request 710, an index number of "Request N" is assigned to an Nth-identified request 710 (where, N is a natural number greater than or equal to 1), and so on. The electronic apparatus 100 processes the requests 710 in sequence based on order of such index numbers assigned as above.

Here, when the number of requests 710 within the time section 720 having a preset time is greater than the threshold, the electronic apparatus 100 does not process the requests 710 which are identified as caused by the misrecognition within the corresponding time section 720. For example, when there is a total of M requests 710 (where, M is a natural number) from "Request N+1" to "Request N+M" within a certain time section 720, it may be identified that the requests 710 in the corresponding time section 720 are caused by the misrecognition of the trigger word in the external apparatus 200. In this case, the electronic apparatus 100 identifies the requests 710 from "Request N+1" to "Request N+M" within the present time section 720 not to be dealt with. However, there may be the request 710 caused by not the misrecognition but normal recognition among these requests 710, and thus the electronic apparatus 100 performs the speech recognition process with regard to the request 710 additionally identified as caused by the normal recognition among these requests 710. In this regard, details will be described later.

However, because the requests 710 are processed in order of the index number, some requests 710 among the requests 710 may be already subjected to the speech recognition process at a point in time when they are identified as caused by the misrecognition. In this case, the electronic apparatus 100 does not process the rest of the requests 710 except the already processed requests 710 in the time section 720. Alternatively or additionally, the electronic apparatus 100 may abort the currently processing request 710 when it is identified that the request is misrecognized.

When a point in time at which the content causing the misrecognition of the trigger word is reproduced is specified, the electronic apparatus 100 can cope with the speech recognition request which will be made by the corresponding content in the future. Below, such an embodiment will be described.

Figure 8:
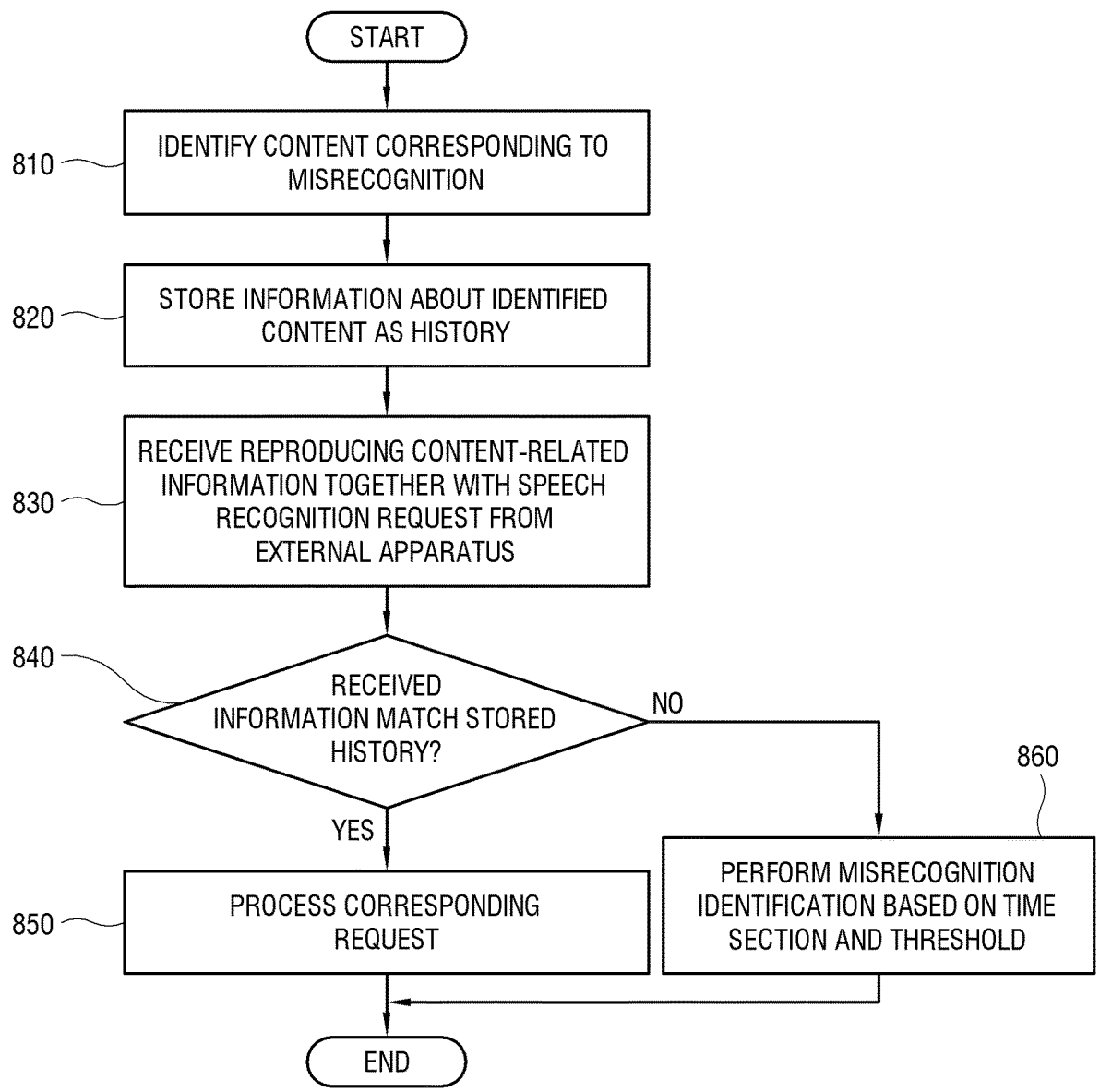
FIG. 8 is a flowchart showing a method by which an electronic apparatus identifies a cause of trigger-word misrecognition and processes requests according to an embodiment.

FIG. 8 is a flowchart showing a method by which an electronic apparatus identifies a cause of trigger-word misrecognition and processes requests according to an embodiment.

Referring to FIGS. 2 and 8, the following operations are performed by the processor 170 of the electronic apparatus 100. The following operations are performed after the foregoing operations of FIG. 4.

At operation 810, the electronic apparatus 100 identifies content corresponding to misrecognition of a trigger word. There are many identifying methods. For example, the electronic apparatus 100 may obtain information about content of a point in time at which the trigger word is detected, in connection with the speech recognition request from the external apparatus 200. Information about the content may be a reproduction scene of content at the corresponding point in time, or identification (ID) and a reproduction point in time of the content based on metadata. When the reproduction scene of the content is received, the electronic apparatus 100 may identify the content and the reproduction point in time of the corresponding scene through an automatic content recognition (ACR) process of the corresponding scene. Further, the electronic apparatus 100 may identify the content and the reproduction point in time corresponding to the information about the content from the external apparatus 200, based on an electronic program guide (EPG) or the like information about a live broadcasting time of content.

At operation 820, the electronic apparatus 100 stores information about the identified content. In other words, the electronic apparatus 100 identifies the content causing the misrecognition of the trigger word generated in the external apparatus 200 and the reproduction point in time of the corresponding content, and stores the content and the reproduction point in time into the storage 140 as historical data.

At operation 830, the electronic apparatus 100 receives content-related information about reproducing content, together with a speech recognition request from the external apparatus 200. When the external apparatus 200 transmits the speech recognition request to the electronic apparatus 100, the content reproduced at the point in time where the trigger word causing the corresponding request is detected and the content-related information showing the reproduction point in time of the corresponding content are transmitted together.

At operation 840, the electronic apparatus 100 identifies whether the received content-related information matches the stored historical data. In other words, the electronic apparatus 100 identifies whether the received content-related information corresponds to historical data related to the misrecognition stored in the operation 820.

When it is identified that the received content-related information matches the history ("YES" in the operation 840), at operation 850, the electronic apparatus 100 does not perform speech recognition with respect to the speech recognition request. In other words, when it is identified that the speech recognition request from the external apparatus 200 matches the historical data related to the misrecognition of the trigger word, the electronic apparatus 100 identifies that the corresponding request is caused by the misrecognition, regardless of the operations shown in FIG. 4.

On the other hand, when it is identified that the received content-related information does not match the historical data history ("NO" in the operation 840), at operation 860, the electronic apparatus 100 performs a misrecognition identifying operation based on the time section and the threshold (in other words, the operations shown in FIG. 4).

When the speech recognition request is not accepted by the electronic apparatus 100, the external apparatus 200 may inform a user of such situation. Below, such an embodiment will be described.

Figure 9:
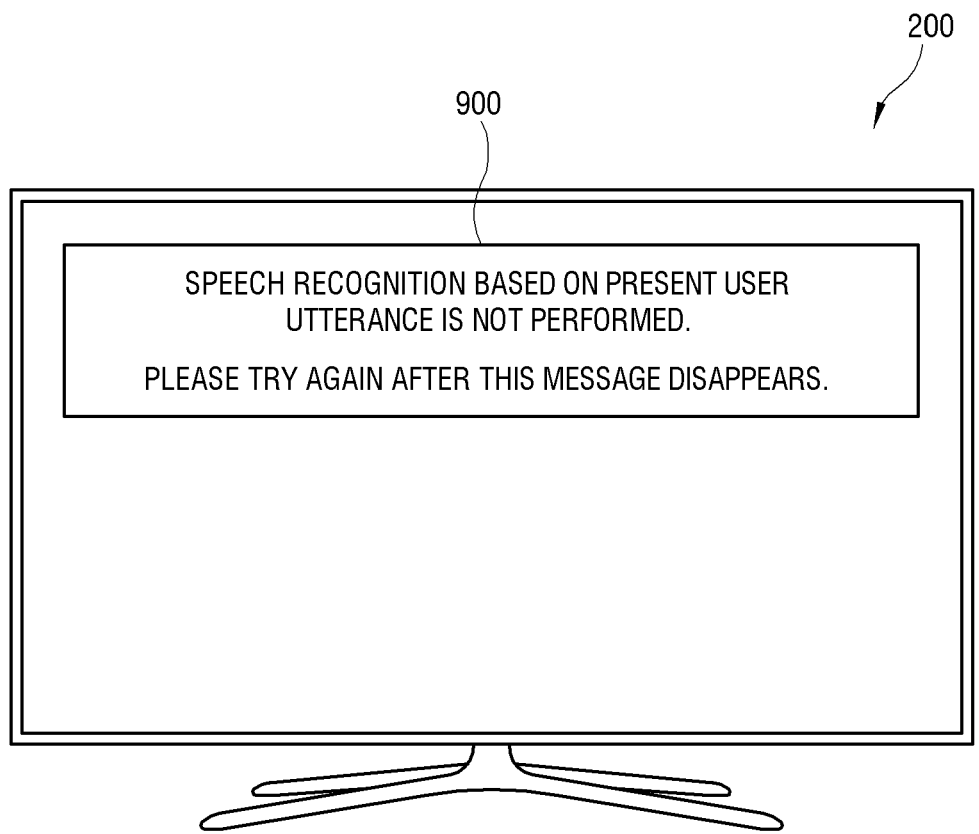
FIG. 9 illustrates that an external apparatus that displays a message informing that speech recognition is not performed according to an embodiment.

FIG. 9 illustrates that an external apparatus that displays a message of informing that speech recognition is not performed according to an embodiment.

Referring to FIGS. 2 and 9, according to the foregoing embodiments, the electronic apparatus 100 does not perform the speech recognition function with regard to the speech recognition requests in the specific time section where the misrecognition occurs, and therefore the external apparatus 200 may display a message 900 or a user interface (UI) to inform a user of the status of the speech recognition processing in this time section. This message 900 notifies that the speech recognition process is not performed on the current user utterance. The electronic apparatus 100 communicates with and notifies the external apparatus 200 of the information about the time section where the speech recognition request is not dealt with, so that the external apparatus 200 can display the message 900 based on this information. The message 900 may be displayed by the external apparatus 200 when the external apparatus 200 includes a display, and may be displayed by other display apparatuses connected to the external apparatus 200 when the external apparatus 200 does not include any display.

The external apparatus 200 does not display the message 900 after the time section, in which the speech recognition request is not processed, passes, thereby allowing a user to aware that the speech recognition request is possible. Alternatively, the electronic apparatus 100 may control the external apparatus 200 to display the message 800 on the external apparatus 200. In other words, the electronic apparatus 100 transmits a control signal for the message 900 so that the external apparatus 200 can operate based on the control signal.

The external apparatus 200 may display the corresponding message 900 when it is notified by the electronic apparatus 100 that the speech recognition process is not performed, or may selectively allow or restrict the display of the message 900 according to conditions. For example, the external apparatus 200 does not display the message 900 when a user does not input the trigger word and it is notified by the electronic apparatus 100 that the speech recognition process is not possible. Then, the external apparatus 200 displays the message 900 when a user inputs the trigger word before the time section, in which it is notified by the electronic apparatus 100 that the speech recognition request is not processed. On the other hand, the external apparatus 200 does not display the message 900 when the trigger word is not input until the time section, in which it is notified by the electronic apparatus 100 that the speech recognition request is not processed. The external apparatus 200 may operate to display the message 900 only when the trigger word is input for the time section in which the electronic apparatus 100 does not process the speech recognition request. In other words, the external apparatus 200 does not display the message 900 when the trigger word is not input, and therefore a user's view is not interrupted by the message 900 unnecessarily displayed on the screen.

The external apparatus 200 may be designed to autonomously identify the misrecognition of the trigger word, so as not to transmit the request caused by the misrecognition to the electronic apparatus 100. Below, such an embodiment will be described.

Figure 10:
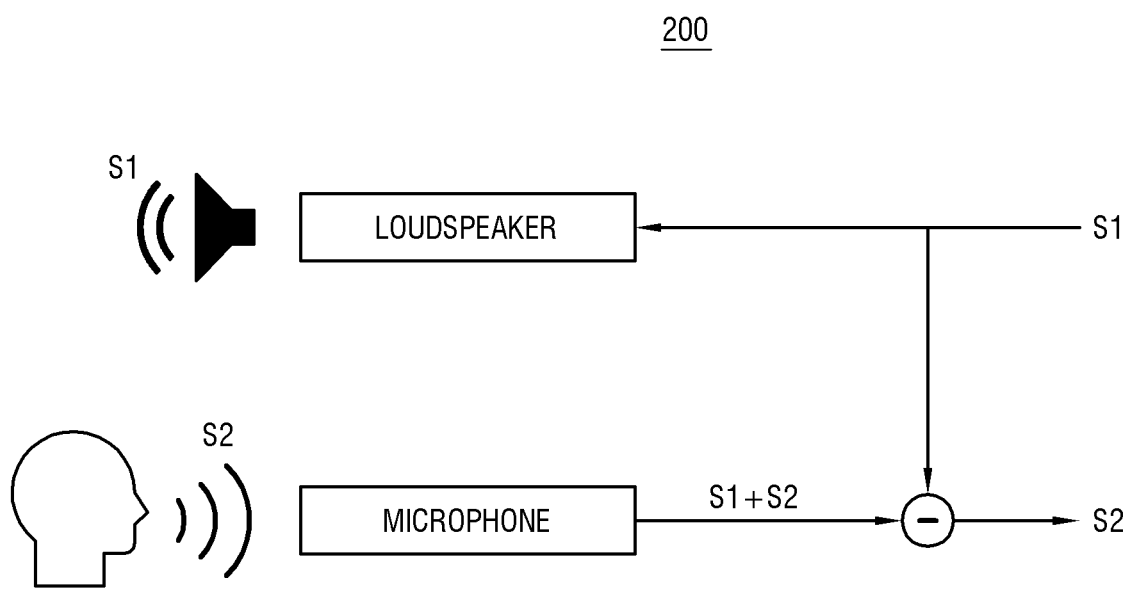
FIG. 10 illustrates a method of an external apparatus excluding an audio signal output from a built-in speaker when processing an audio signal collected by a microphone, according to an embodiment.

FIG. 10 illustrates a method of an external apparatus excluding an audio signal output from a built-in speaker when processing an audio signal collected by a microphone, according to an embodiment.

Referring to FIGS. 2 and 10, the external apparatus 200 includes the loudspeaker 250 to output sound based on an audio, and the microphone 260 to collect sound of ambient environments and transmit the collected sound to the processor 270. When content is reproduced, the processor 270 transmits an audio component S1 of the content to the loudspeaker 250, thereby outputting a sound through the loudspeaker 250. If a user utters a word at this time, the microphone 260 collects the sound of ambient environments and generates an audio signal. The audio signal generated by the microphone 260 includes an audio component S1 of content output through the loudspeaker 250 and an audio component S2 uttered by a user as well as noise.

The external apparatus 200 removes the audio component S1 of the content from the audio signal S1+S2, thereby extracting the audio component S2 uttered by a user. The external apparatus 200 identifies whether the audio component S2 involves the trigger word.

In addition, it may be assumed that a user does not utter a word. In this case, an audio signal collected in the microphone 260 includes only the audio component S1 of the content output through the loudspeaker 250 besides noise. When the external apparatus 200 removes the audio component S1 from this audio signal, noise and no substantive audio component are left. Therefore, although the audio component S1 may include an audio component to be misrecognized as the trigger word, the external apparatus 200 does not transmit an abnormal speech recognition request to the electronic apparatus 100 based on such a method.

The electronic apparatus 100 may identify that all the requests are caused by the misrecognition, within the time section where it is identified that the number of requests exceeds the threshold. Alternatively, the electronic apparatus 100 may distinguish between the requests caused by normal utterance (in other words, when a user normally utters the trigger word) and the requests caused by the misrecognition within the corresponding time section. In this case, the electronic apparatus 100 does not perform the speech recognition process with regard to the requests caused by the misrecognition, but performs the speech recognition process with regard to the requests caused by the normal utterance within the corresponding time section. There are many methods of identifying which requests are caused by the normal utterance among the requests within the identified time section where it is identified that the misrecognition is generated. Below, such an embodiment will be described.

Figure 11:
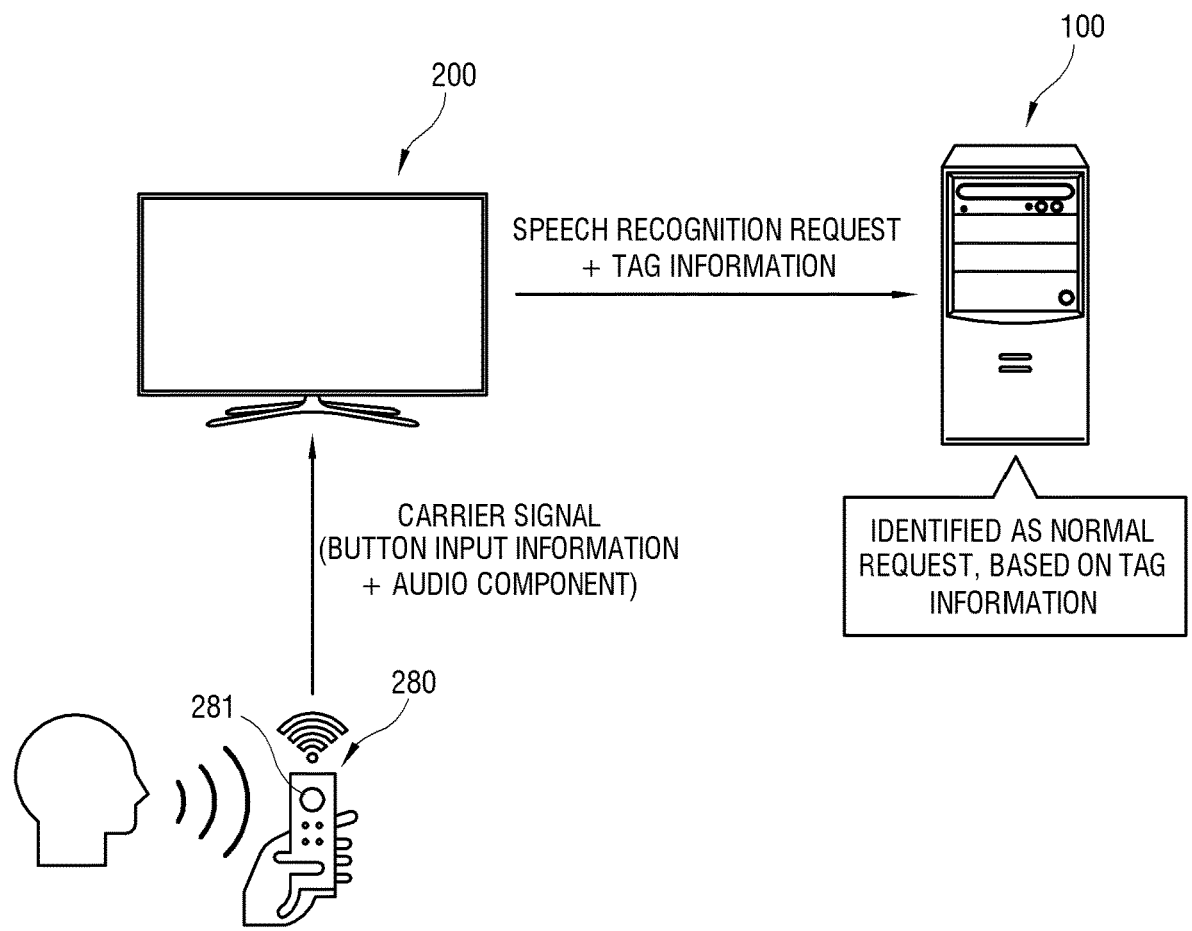
FIG. 11 illustrates that an electronic apparatus receives tag information along with a speech recognition request from an external apparatus according to an embodiment.

FIG. 11 illustrates that an electronic apparatus receives tag information along with a speech recognition request from an external apparatus according to an embodiment.

As shown in FIG. 11, the external apparatus 200 transmits a speech recognition request for an audio signal to the electronic apparatus 100. When it is possible for the external apparatus 200 to identify whether the speech recognition request is normally caused by a user's utterance, the external apparatus 200 transmits tag information or flag information, which shows that the corresponding request is caused by normal user utterance, together with the speech recognition request to the electronic apparatus 100.

When the tag information is received together with the speech recognition request from the external apparatus 200, the electronic apparatus 100 identifies that the corresponding request is caused by the normal user utterance based on the tag information. Although the request is made within the time section where the misrecognition is generated, the electronic apparatus 100 normally processes the corresponding request.

There are many methods by which the external apparatus 200 identifies whether the speech recognition request is normally caused by a user's utterance. As an example, it will be assumed that the microphone 281 is installed in the remote controller 280, and activated when a user presses a specific button on the remote controller 280. When the carrier signal transmitted from the remote controller 280 to the external apparatus 200 includes input information about the specific button in addition to an audio component, this shows that a user's utterance is input by the user's active control. When the carrier signal includes the input information, the external apparatus 200 transmits the tag information together with the speech recognition request for the audio component to the electronic apparatus 100.

As another example, the external apparatus 200 may store a voice profile of a registered user. The voice profile refers to a profile that exhibits various audio characteristics (e.g., accent, utterance speed, tone, etc.) about a user's utterance, which may have various forms such as a waveform, etc. Because people have different voice profiles, the external apparatus 200 may identify whether an input audio signal is caused by normal user utterance based on whether the audio signal matches a previously stored voice profile. The external apparatus 200 generates the tag information when the audio signal matches the voice profile, and does not generate the tag information when the audio signal does not match the voice profile.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be well known and available to those skilled in the art of computer software. Further, the computer program instruction may be implemented by a computer program product.

What is claimed is:

1. An electronic apparatus for performing speech recognition, the electronic apparatus comprising:
   a communication interface; and
   a processor configured to:
   receive, via the communication interface, speech recognition requests from a plurality of external apparatuses that are connected to the electronic apparatus through a communication network, wherein each of the speech recognition requests includes a trigger word recognized by a corresponding external apparatus of the plurality of external apparatuses,
   identify whether a number of the speech recognition requests received from the plurality of external apparatuses within a time section exceeds a threshold,
   control the speech recognition not to be performed on each of the speech recognition requests received from the plurality of external apparatuses based on the number of the speech recognition requests received from the plurality of external apparatuses exceeding the threshold,
   perform the speech recognition on each of the speech recognition requests received from the plurality of external apparatuses based on the number of the speech recognition requests received from the plurality of external apparatuses not exceeding the threshold, and
   transmit results of the speech recognition to the plurality of external apparatuses via the communication interface,
   wherein the processor is further configured to identify whether the number of the speech recognition requests received from the plurality of external apparatuses within the time section exceeds the threshold by sequentially counting the number of the speech recognition requests while moving the time section along a time axis and comparing the counted number of the speech recognition requests with the threshold, and
   wherein the time section has a first period of time, and the moved time section has a second period of time being a same as the first period of time, and the first period of time being overlapped with the second period of time.

2. The electronic apparatus of claim 1, wherein each of the speech recognition requests comprises a user utterance within the time section.

3. The electronic apparatus of claim 1, wherein the processor is further configured to adjust the threshold based on historical data on a plurality of speech recognition requests received from the plurality of external apparatuses.

4. The electronic apparatus of claim 3, wherein the processor is further configured to adjust the threshold based on an average of the number of the plurality of speech recognition requests in a plurality of time sections.

5. The electronic apparatus of claim 1, wherein the processor is further configured to adjust a time width of the time section based on a point in time at which at least one of the plurality of external apparatuses receives and reproduces content.

6. The electronic apparatus of claim 1, wherein the processor is further configured to adjust a time width of the time section based on a network condition with at least one of the plurality of external apparatuses through the communication interface.

7. The electronic apparatus of claim 1, wherein the processor is further configured to adjust a time width of the time section, based on an average of time widths of a plurality of time sections where the number of the speech recognition requests is greater than or equal to a predetermined value.

8. The electronic apparatus of claim 1, wherein the processor is further configured to control the speech recognition not to be performed for the speech recognition requests in a second time section, based on a difference in the number of the speech recognition requests between a first time section and the second time section exceeding a difference threshold, the first time section being adjacent to the second time section.

9. The electronic apparatus of claim 1, wherein the processor is further configured to:
   store information about content corresponding to misrecognition of the plurality of external apparatuses, and
   not to perform the speech recognition for the speech recognition requests based on the speech recognition requests received from the plurality of external apparatuses being identified as corresponding to the content.

10. The electronic apparatus of claim 1, wherein the processor is further configured to transmit a message, including a status that the speech recognition is not performed for the speech recognition requests exceeding the threshold, to the plurality of external apparatuses so that the message can be displayed on the plurality of external apparatuses.

11. A method of controlling an electronic apparatus for performing speech recognition, the method comprising:
    receiving, via a communication interface of the electronic apparatus, speech recognition requests from a plurality of external apparatuses that are connected to the electronic apparatus through a communication network, wherein each of the speech recognition requests includes a trigger word recognized by a corresponding external apparatus of the plurality of external apparatuses;
    identifying whether a number of the speech recognition requests received from the plurality of external apparatuses within a time section exceeds a threshold;
    controlling the speech recognition not to be performed on each of the speech recognition requests received from the plurality of external apparatuses based on the number of the speech recognition requests received from the plurality of external apparatuses exceeding the threshold,
    performing the speech recognition on each of the speech recognition requests received from the plurality of external apparatuses based on the number of the speech recognition requests received from the plurality of external apparatuses not exceeding the threshold; and
    transmitting results of the speech recognition to the plurality of external apparatuses via the communication interface,
    wherein the identifying comprises identifying whether the number of the speech recognition requests received from the plurality of external apparatuses within the time section exceeds the threshold by sequentially counting the number of the speech recognition requests while moving the time section along a time axis and comparing the counted number of the speech recognition requests with the threshold, and wherein the time section has a first period of time, and the moved time section has a second period of time being a same as the first period of time, and the first period of time being overlapped with the second period of time.

12. The method of claim 11, wherein each of the speech recognition requests comprises a user utterance within the time section.

13. The method of claim 11, further comprising adjusting the threshold based on historical data on a plurality of speech recognition requests received from the plurality of external apparatuses.

14. The method of claim 13, wherein the adjusting of the threshold based on the historical data comprises adjusting the threshold based on an average of the number of the plurality of speech recognition requests in a plurality of time sections.

15. The method of claim 11, further comprising adjusting a time width of the time section based on a point in time at which at least one of the plurality of external apparatuses receives and reproduces content.

16. The method of claim 11, further comprising adjusting a time width of the time section based on a network condition with at least one of the plurality of external apparatuses through the communication interface.

17. The method of claim 11, further comprising adjusting a time width of the time section based on an average of time widths of a plurality of time sections where the number of the speech recognition requests is greater than or equal to a predetermined value.

18. The method of claim 11, wherein the speech recognition is controlled not to be performed for the speech recognition requests in a second time section based on a difference in the number of the speech recognition requests between a first time section and the second time section exceeding a difference threshold, the first time section being adjacent to the second time section.

19. The method of claim 11, further comprising storing information about content corresponding to misrecognition of the plurality of external apparatuses, and
   wherein the controlling of the speech recognition not to be performed on each of the speech recognition requests comprises controlling the speech recognition not to be performed on each of the speech recognition requests based on the speech recognition requests received from the plurality of external apparatuses being identified as corresponding to the content.

20. The method of claim 11, further comprising transmitting a message including a status that the speech recognition is not performed for the speech recognition requests exceeding the threshold, to the plurality of external apparatuses so that the message can be displayed on the plurality of external apparatuses.

* * * * *